WALTER A. WOOD.

Improvement in Oil-hole Covers for Journal Boxes.

No. 120,693.                                   Patented Nov. 7, 1871.

Witnesses
Jno. D. Patten
Edmund Masson

Inventor.
Walter A. Wood
By atty A. B. Stoughton.

UNITED STATES PATENT OFFICE.

WALTER A. WOOD, OF HOOSICK FALLS, NEW YORK.

IMPROVEMENT IN OIL-HOLE COVERS FOR JOURNAL-BOXES.

Specification forming part of Letters Patent No. 120,693, dated November 7, 1871.

*To all whom it may concern:*

Be it known that I, WALTER A. WOOD, of Hoosick Falls, in the county of Rensselaer and State of New York, have invented certain new and useful Improvements in Self-Closing Oil-Hole Covers or Protectors, more especially useful in harvesting-machines, but applicable to other machinery; and I do hereby declare the following to be a full, clear, and exact description of the same, reference being had to the accompanying drawing making a part of this specification, in which—

Figure 1:
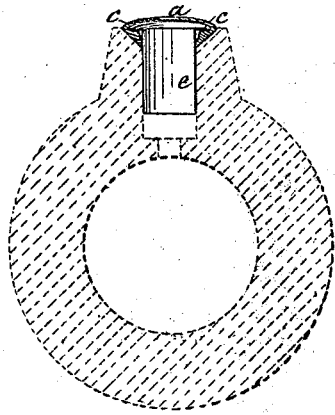
Figure 2:
Figure 3:
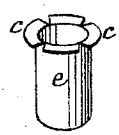
Figure 4:
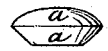

Figure 1 represents the application of the device in question to a journal-box or shaft or axle-bearing. Fig. 2 represents, in perspective, the cover and means of applying or holding it in place. Figs. 3 and 4 represent, respectively, the tube and the rubber cap, that, together, form the protector to the oil-hole.

Harvesting-machines, from the nature of their work and the gritty nature of the dust they make and work in, require constant and careful oiling, and the oil-holes must be capped or covered to keep the grit from the boxes or bearings. These caps or covers are troublesome and dirty things to handle, and frequently drop and are lost. The nature and object of my invention is to make an oil-hole cover that need not be removed when the journals are to be oiled; that cannot get lost or mislaid, and that will be self-closing when the nozzle of the oil-can is removed; and it consists in a vulcanized slotted rubber cap, sprung or stretched over a tube, which latter is inserted in the oil-hole of the box or bearing to give support to said cap or cover.

To enable others skilled in the art to make and use my invention, I will proceed to describe the same with reference to the drawing.

A vulcanized rubber cap, $a$, is first prepared, which is hollow underneath, and this cap is stretched and drawn over the flange $c$ of a metallic tube, $e$, so as to be held firmly thereto. The top of the cap $a$ is slotted, as at $f$, so that by pressing against the flaps with the nozzle of an oil-can the nozzle will pass through said cap and deliver the lubricator into the tube $e$, whence it runs down into the box or onto the bearings. When the nozzle of the can is withdrawn the elasticity of the rubber will cause the flaps to rise and close the oil-hole against the entrance of dust. What is called the tube may be simply a ring, merely to keep the rubber cap in form and admit of applying and holding it to the journal-box or bearing. The slots $f$ may be cut in the cap after it is made, or it may be cut before it is vulcanized and vulcanized in, which would prevent it from tearing and make it more rigid.

What I claim as new, and desire to secure by Letters Patent, is—

An oil-hole cover or protector, made of a slotted rubber cap united to a tube or ring, and inserted in or over the oil-hole to be protected, substantially as described and represented.

WALTER A. WOOD.

Witnesses:
G. W. ALLEN,
J. RUSSELL PARSONS.

(87)